United States Patent [19]

Bühler

[11] Patent Number: 4,764,653

[45] Date of Patent: Aug. 16, 1988

[54] PROCESS AND APPARATUS EMPLOYING ELECTROEROSION

[75] Inventor: Ernst Bühler, Losone, Switzerland

[73] Assignee: AG fur industrielle Elektronik AGIE Losone bei Locarno, Losone, Switzerland

[21] Appl. No.: 906,420

[22] Filed: Sep. 11, 1986

[30] Foreign Application Priority Data

Sep. 16, 1985 [DE] Fed. Rep. of Germany ....... 3533002

[51] Int. Cl.$^4$ .......................... B23H 7/00; B23H 7/22
[52] U.S. Cl. .............................. 219/69 E; 204/224 M; 219/69 R; 219/69 W
[58] Field of Search ............... 219/69 E, 69 W, 69 M, 219/69 R; 269/7, 8; 204/206, 224 M, 297 R; 228/122, 56

[56] References Cited

U.S. PATENT DOCUMENTS

| | | | |
|---|---|---|---|
| 4,392,766 | 7/1983 | Blunt | 901/40 |
| 4,518,842 | 5/1985 | Obara | 219/69 W |
| 4,584,451 | 4/1986 | Inoue | 219/69 W |
| 4,596,066 | 6/1986 | Inoue | 219/69 E |
| 4,616,796 | 10/1986 | Inoue | 269/8 |
| 4,626,645 | 12/1986 | Inoue et al. | 219/69 R |
| 4,687,893 | 8/1987 | Rasmussen et al. | 228/12 |
| 4,698,475 | 10/1987 | Lothenbach et al. | 204/297 R |

FOREIGN PATENT DOCUMENTS

| | | | |
|---|---|---|---|
| EP0093026 | 4/1983 | European Pat. Off. | |
| 113301 | 7/1984 | European Pat. Off. | 269/8 |
| 852642 | 4/1953 | Fed. Rep. of Germany | |
| 904972 | 1/1954 | Fed. Rep. of Germany | 269/8 |
| 2816588 | 4/1978 | Fed. Rep. of Germany | |
| 3209136 | 3/1982 | Fed. Rep. of Germany | |
| 3326416 | 7/1983 | Fed. Rep. of Germany | |
| 3530783 | 3/1986 | Fed. Rep. of Germany | 219/69 R |
| 115444 | 10/1974 | German Democratic Rep. | |
| 226234 | 8/1985 | German Democratic Rep. | 269/8 |
| 168836 | 10/1982 | Japan | 219/69 E |

OTHER PUBLICATIONS

Technische Rundschau No. 21 (1985), pp. 26-33.
Technische Rundschau No. 29 (1985) pp. 8-11.
VDI-Berichte No. 241 (1975), pp. 33-36 and 61-68.
Patents Abstracts of Japan, Unexamined Applications, Section M. vol. 2, No. 63, May 13, 1978, p. 1033 Kokai Nr. 53-24200 (Inoue).
Techische Rundschau No. 29 (1985) p. 11 and p. 8.

Primary Examiner—A. D. Pellinen
Assistant Examiner—Geoffrey S. Evans
Attorney, Agent, or Firm—Helfgott & Karas

[57] ABSTRACT

An electroerosion process and apparatus are used to produce crude electrodes which are shaped thereafter into finished form by wire cutting erosion. The finished electrodes are used in subsequent countersinking of workpieces by electroerosion.

13 Claims, 3 Drawing Sheets

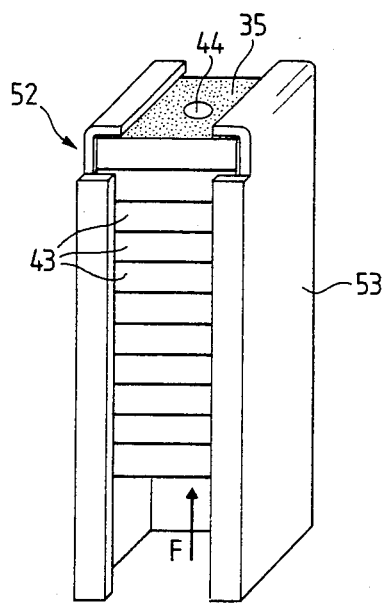
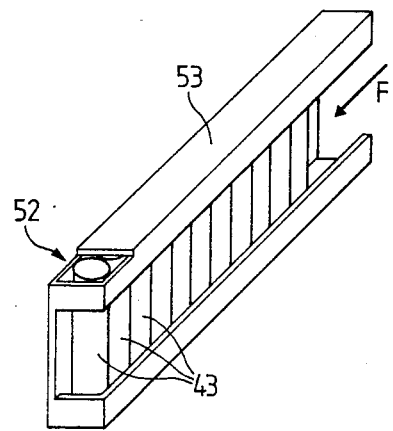
FIG. 4a
FIG. 4b
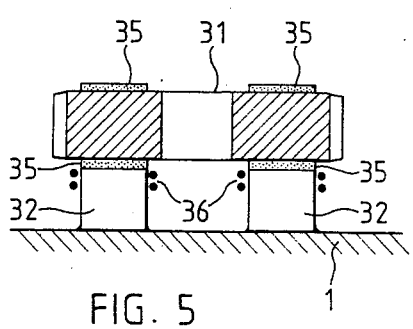
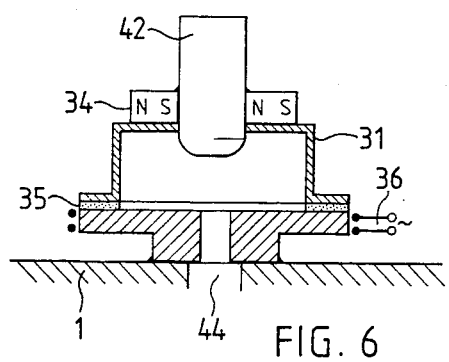
FIG. 5
FIG. 6

PROCESS AND APPARATUS EMPLOYING ELECTROEROSION

BACKGROUND OF THE INVENTION

The present invention relates to a process and apparatus employing electroerosion. The journal "Technische Rundschau", No. 29, 1985, Hallwag-Verlag, Berne, Switzerland, pg. 11 discloses a process for electroeroding an electrode fixed in a spindle sleeve of a countersunk erosion machine in order to calibrate the length and/or diameter of the electrode. The machine also has a machine table carrying a counter electrode. The calibrated electrode is used for countersinking of workpieces, which are also mounted on the machine table. The machine also employs a tool electrode changer and/or a work pallet system with a complete mounting or clamping system. The disclosure also states that it is difficult to align a workpiece on the table and that it can be advantageous to measure the precise position of the workpiece using mechanical or electronic probes, which are, for example, measurement electrodes in the tool changer.

Electrode changers for countersunk erosion machines were exhibited at the EMO Machine Tool Exhibition in Hanover in 1981 by the Swedish firm 3R. This exhibit also demonstrated that complicated countersinking or countersunk electrodes can be subdivided into several partial electrodes.

The electrode subdivision according to the aforementioned 3R system, in principle makes very severe demands on the electrode manufacture and is therefore only used in special cases. JP-OS No. 53-24200/74 describes a wire cutting machine, which uses the fragments produced during cutting erosion for a conical widening by planetary erosion, said fragments serving as the countersunk electrode. This concept is limited to producing a countersunk electrode adapted to the exact shape of the previously cut opening in the workpiece. This machine cannot be used for the general production of more complicated countersunk electrodes. It is known to work countersunk electrodes on another eroding machine, where they act as workpieces and following the production and following the production thereof as an "electrode", they are used as a countersunk electrode on another machine. Inter alia this suffers from the disadvantage that the production sequence (from the crude electrode to the completely worked workpiece) cannot be automated. Thus, these are purely auxiliary processes, which are rarely used.

It is also known in the art that wire cutting means can be fitted to a spindle sleeve of a countersinking erosion machine. An example for this is provided in the journal "EDM-Digest", January/February 1985, pg. 13 in an advertisement by EDM Technology, New York, USA.

SUMMARY OF THE INVENTION

It is an object of this invention to improve the processes and electroerosion apparatus of the aforementioned type in such a way that the erosion process can be further automated for three-dimensional shapes, while as far as possible improving the precision of the working and the work result.

Another object is to provide improved processes and apparatus employing electroerosion in such manner that starting from the raw material for the electrode or electrodes and workpiece right up to the fully worked workpiece, all processes can be automated, so that unsupervised 24 hour operation with a countersinking machine is possible.

Yet another object is to eliminate the prior art requirement for the necessity of reclamping between the initial electrode production and the subsequent countersinking process, whereby manual or even cutting electrode production is eliminated.

In accordance with the principles of the invention, the process includes the steps of providing a crude electrode, clamping the crude electrode to a spindle, and shaping the clamped electrode into finished form by wire cutting erosion without unclamping the electrode. The shaping step is carried out in a first working zone and the shaped electrode is used in a second working zone in the electroerosion countersinking of a workpiece.

In accordance with the principles of the invention, electroerosion apparatus or machine uses a supporting table disposed in an xy plane, first means to move the table in the x direction in said xy plane, second means to move the table in the y direction in said xy plane, a spindle sleeve disposed along a z axis at right angles to the xy plane and disposed above the xy plane, said sleeve being adapted to hold detachably an electrode, a container adapted to be filled with a dielectric fluid and secured to said table; and wire cutting means having a cutting wire and disposed in the container, said means being tiltable to tilt said wire with respect to the xy plane.

The aforementioned objects and advantages of the invention as well as other objects and advantages thereof will either be explained or will become apparent to those skilled in the art when this specification is read in conjunction with the accompanying drawings and specific description of preferred embodiments which follow.

BRIEF DESCRIPTION OF THE DRAWINGS

FIGS. 4a, 4b show stacking magazines.

FIG. 5 shows a workpiece with gripping surfaces.

FIG. 6 shows a magnetically engaged workpiece.

DETAILED DESCRIPTION OF THE PREFERRED EMBODIMENTS

Figure 1:
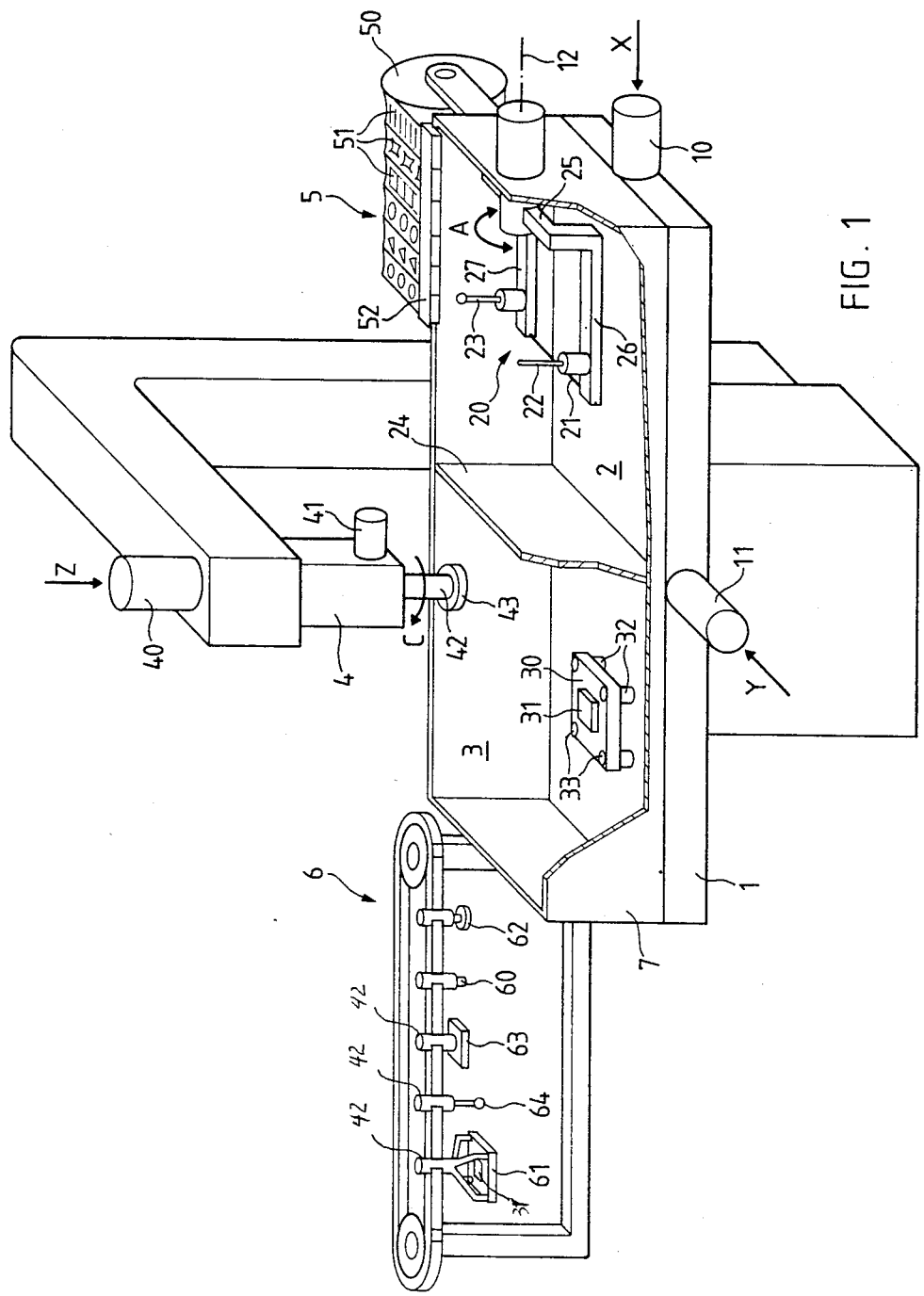
FIG. 1 illustrates an electroerosion machine according to one embodiment of the invention.

Apart from the conventional (not shown) components such as digital control system, generator and dielectric treatment means, the machine of FIG. 1 comprises a table 1 movable in at lest one principal working plane (XY-plane), a first working zone 2, a second working zone 3, a spindle sleeve 4, a crude electrode magazine 5, an electrode changer 6 and a dielectric container 7. Container 7 is fixed to table 1 and therefore moves with the latter. Table 1 has drive units 10 and 11 for moving the table along the X and Y axes respectively.

A wire cutting means 20 is disposed in a first working zone 2 of container 7. This wire cutting means has the usual wire electrode 21, the wire being positioned in longitudinally taut manner. Use is made of the conventional (not shown) components of a wire cutting machine, such as unwinding mandrels, wire drive, lead-in wires, wire guides, flushing nozzles and winding-up rolls. The corresponding function of these components does not differ from that of known wire cutting machines.

Wire cutting means 20 is in this case movably mounted, so that the wire electrode can be titled with respect to the principal working plane (XY-plane). The wire can be oriented from a position parallel to the XY-plane to a position at right angles thereto. For this purpose, the wire cutting means 20 is mounted on a wall of container 7 so as to be rotatable in the represented embodiment about an axis parallel to the XY-plane by drive unit 12. The rotation direction is indicated by arrow A. As shown, the wire cutting means has a U-shaped clip 25 with two coplanar arms 26, 27 parallel to the XY-plane. These arms have free ends notched to receive the wire. These notches are made less deep than the wire electrode diameter, so as to give the maximum number of degrees of freedom for the wire cutting process. The two arms 26, 27 are slightly displaced with respect to rotation axis of the means. Set back somewhat from the wire electrode axis, on arms 26, 27 are provided a drilling means 22 and a probe 23, whose major axis are both at right angles to the wire axis. Drilling means 22 can be a subassembly of the type conventionally used on wire cutting machines, but can also have a much simpler construction, in that a pin-like or tubular crude electrode is fixed on drilling means 22 in the manner to be described relative to FIG. 5. The drilling means does not require its own feed drive, because the feed movement can be controlled by the various drive units.

The first working zone 2 is used for the cutting erosion of "workpieces" which, as will be explained hereinafter, are mounted on the spindle sleeve 4. In the specific case, said workpieces are crude electrodes 43, which are fixed by means of a mandrel 42 to spindle sleeve 4. The latter can be moved in the direction of the Z-axis (at right angles to the XY-axis) by a drive unit 40. By means of a drive unit 41, electrode 43 and its mandrel 42 can be rotated about the Z-axis and this is normally called the C-axis.

In the first working stage, the wire cutting means 20 is used in such manner in the first working zone that cutting erosion shapes the crude electrode representing the "workpiece" here. The first working zone 2 is filled with an aqueous dielectric. In the represented embodiment, the first and second working zones are separated by a partition 24.

The countersinking process is carried out in second zone 3 and is normally flooded with a hydrocarbon dielectric. However, for certain special applications using small electrodes, it can also be advantageous to perform the countersinking process with an aqueous dielectric and in this case there is no need for partition 24.

If the electrode has been shaped for subsequent use in countersinking in the first working zone 2, table 1 and, if there is a partition 24, the spindle sleeve 4 is then positioned in such a way that the second working zone 3 is located under the spindle sleeve. The second working zone 3 contains several table-like mandrels 32, only three of which are shown in FIG. 1. These mandrels are used for fixing or mounting workpiece pallets 30 or specially prepared workpieces 31. On the spindle sleeve side and table side, the workpiece pallets have specially prepared gripping surfaces.

As stated, spindle sleeve 4 can be moved in the Z-direction and also has a rotation axis C, which can rotate mandrel 42 with the electrode 43. Slip rings and flushing passages are provided, which do not limit the torsion angle.

Behind the working zone 2 are provided a plurality of crude electrode magazines 5, where crude electrode strips 51 are wound onto reels 50 or individual crude electrodes 43 are placed in a stacking magazine 53 to be described hereinafter. Transfer means 52 ensure a completely satisfactory removal of the electrodes from the magazines. Similar magazines can store smaller workpieces, such as e.g. nozzles, micro-parts and tool bits for cutting tools.

Table 1 can be positioned that mandrel 42 reaches the in each case desired magazine removal point.

Disposed along side of the second working zone 3, there is an electrode changer 6 of basically known construction, which can also be displaced by the movement of table 1. This electrode changer 6 contains, for example, empty mandrels 60, workpiece pallets 61, as well as used, but still usable electrodes 63, completely worked special electrode 62 and optionally also probes 64. All these parts have unitary (preferably standardized) mandrels 42.

A typical working or machining cycle takes place in the following way.

1. A workpiece pallet 61 carrying workpiece 31 is taken for the electrode changer 6 and is fixed in the conventional manner on spindle sleeve 4.

2. The first working zone 2 is occupied and with the probe 23 rotated into a favourable position any clamping or mounting error is measured.

3. The second working zone is occupied, the pallet 61 is so oriented via axes X, Y, Z and C, that the clamping or mounting error becomes zero.

4. The pallet 61 is connected to the table-side mandrels 32, the spindle sleeve-side mandrel 42 is detached from the pallet and intermediately stored in electrode changer 6.

5. A suitable, empty mandrel 60 is removed from electrode changer 6 and is charged at the crude electrode magazine 5 with a selected crude electrode 43.

6. The crude electrode is machined to the desired final dimensions using wire cutting means 20.

7. In the second working zone 3, the desired shape of workpiece 331 is produced by translation and/or rotation via axes X, Y, C and Z using countersinking erosion.

8. Optionally stages 5 to 7 are repeated several times. Worn electrodes 43 are ejected into a not shown waste container or, if they are still usable, are intermediately stored in electrode changer 6, whereas mandrel 60 no longer being used are also stored in electrode changer 6.

9. In the reverse sequence, pallet 61 is brought with the finished workpiece 31 back into the electrode changer.

10. A new and possibly different working cycle is automatically started.

The above example shows that apart from the preparation of suitable raw material, working out the machining program and removing the finished workpieces, no manual operations have to be performed. In fact many cycles can be automatically generated by means of a so-called service program, which only has to be set up once. Such service programs contain tables with empirical values calculation algorithms for parameters and tables with coordinate values of electrode changers, clamping or mounting positions, measuring positions and the like. Although the setting up of such service programs is very complicated, it is also worth while, because they can subsequently be used by all plant users.

The above description clearly shows the importance of a precise fixing of the crude electrode and workpiece. This problem can only be solved with difficulty using conventional clamping systems, because the clamped material can have a weight differing from a few grams to several dozen Kilograms. In addition, the fixing operation must take place in a highly precise manner in the occupied position and must not undergo any variation due to clamping movement.

According to a further development of the invention, fixing takes place by soft soldering and for this purpose the particular mandrel, (for example, mandrels 32 and 42), as well as optionally the crude electrode, workpiece or pallet are provided with a soft solder alloy coating 35. The coating thickness permits corrections in all space axes up to a few hundred um. For fixing or mounting purposes, the mandrel is heated until the soft solder metals, the parts to be fixed being secured in position. After the solder has cooled and solidified, the desired part is precisely mounted and cannot subsequently be displaced.

Figure 2A:
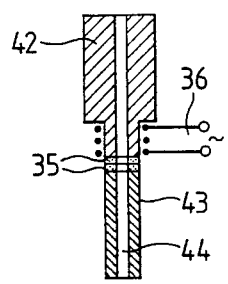
FIGS. 2a, 2b and 2c show mandrels used in the embodiment of FIG. 1.

An example of the mounting is shown in FIG. 2. FIG. 2a shows a tubular countersinking electrode 43 with a flushing bore 44, which is mounted on a mandrel 42. The latter is already secured into the spindle sleeve 4. The opposite ends of mandrel 42 and electrode 42 are each provided with a soft solder alloy coating 35, which can be heated and melted by a resistance heating system 36. For subsequent removal or detachment, the soft solder alloy can be subsequently melted in the same way. For this application, soft solder materials with melting points between 60° and 200° C. are suitable. These requirements can be adequately fulfilled by soft solders used in the electrical industry and soft solder pastes applied by screen process printing. The resistance heating system 36 is fixed to the lower free end of mandrel 42.

Figure 2B:
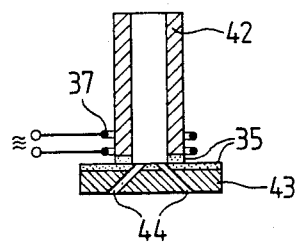

A similar example is shown in FIG. 2b, but with the difference that mandrel 42 and the in this case plate-like crude electrode 43 with coatings 35 is heated by a high frequency induction coil 37. The sloping flushing bores were eroded or formed by the drilling means 22. In the two examples of FIGS. 2a and 2b, the heating electrical energy can be supplied by the erosion generator. In the first case only one connection of the resistance heating system 36 is connected to mandrel 42, while the other end is connected to a current fixed contact, which is connected to the table or other point of fixed potential. In the case of suitable parameters, for heating purposes it is merely necessary to switch on the erosion generator for a few seconds. The cooling time can be greatly reduced by a flow of flushing liquid through the flushing bores 44.

Figure 2C:
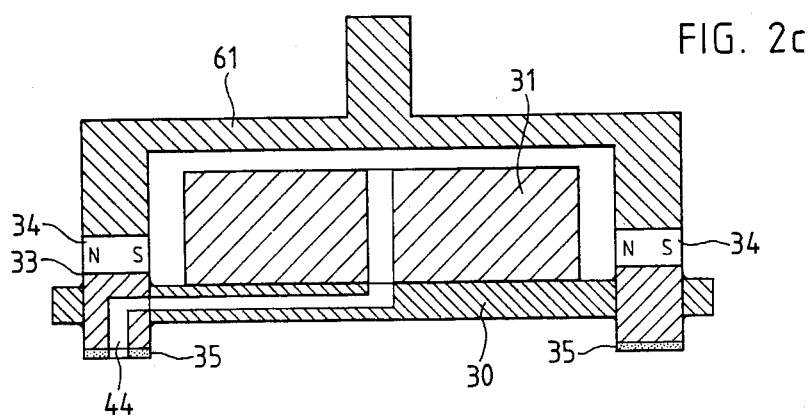

FIG. 2c shows the use of this clamping method in a workpiece pallet 30, on which the workpiece 31 is secured. Workpiece 31 and workpiece pallet 30 also have flushing bores 44. On the table-side gripping surface, the workpiece pallet 30 also has soft solder alloy coatings 35. The flushing bore 44 passes through the coating 35. Unlike in the preceding examples, the spindle sleeve-side mandrel 61, which in this case is bell-shaped with projecting pins, has permanent magnets 34, which adhere to the ferromagnetic gripping surfaces 33 of workpiece pallet 30. As the table-side soldered connections of coatings 35 adhere better after cooling than permanent magnets 34, so that the force action of the X-axis drive is sufficient for separating the upper connection. Conversely for removing the workpiece pallet, the adhesive power of permanent magnets 34 is greater than that of the melted solder. For heating the spindle sleeve-side mandrel 42, the table-side mandrel 32 has a corresponding resistance or induction heating system.

Figure 3A:
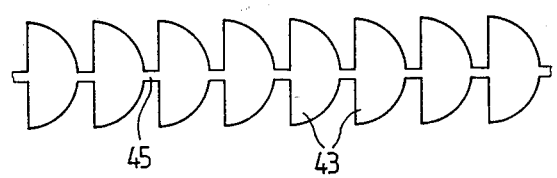
FIGS. 3a, 3b and 3c show different crude electrodes in strip form.
Figure 3B:
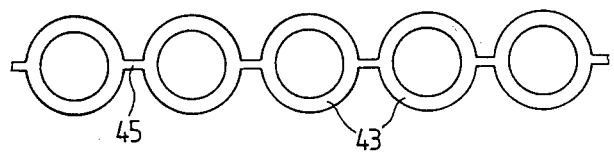
Figure 3C:
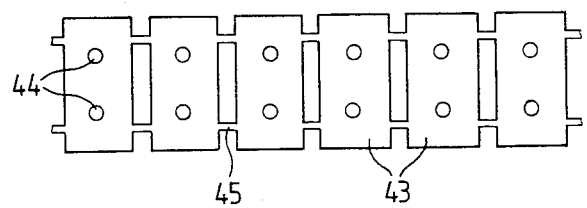

FIGS. 3a to 3c show crude electrodes 43, which are brought into strip form by punching or milling operations in automatic machines, while leaving a connecting web 45. Thus, it is possible to wind several thousand crude electrodes 42 onto the spool or reel magazine 50 (FIG. 1). On removing an electrode 43, the web 45 is removed by a punching or shearing means. The crude electrodes also have gripping-side melting coatings 35 and can also have prefabricated flushing bores.

In place of a reel magazine, it is also possible to use a stacking magazine according to FIGS. 4a and 4b. FIG. 4a shows a vertical stacking magazine 53 with stacked crude electrodes 43, which are forced upwards by spring tension F against a transfer means 52. In the case of this magazine, two wall parts are merely bent inwards by 90° and therefore constitute a stop for the crude electrodes. At the end face of the top electrode, stacking magazine 53 has an opening, so that in each case top electrode can be horizontally ejected. The top surface of the electrodes also has a soft solder alloy coating 35. During removal, this coating 35 is melted together with the coating of mandrel 42. Then, by a movement in the Y-axis direction, the crude electrode is removed to the front or rear. Following removal, the next crude electrode 43 jumps into the removal position.

FIG. 4b shows a horizontal stacking magazine 53, which functions in similar way, but the tubular crude electrodes 43 are removed at the top.

FIG. 5 shows the fixing of a workpiece 31 to the table without using a pallet. Workpiece 31, which for example can be a gear, is provided with coatings 35 on both sides, the lower coatings 35 being melted with the table-side mandrels 32. The heating windings 36 of the table-side mandrels 32 can also be connected by means of a switch to an erosion generator. Workpiece 31 is advantageously provided with coatings 35 by screen process printing and is stored in stacking magazines 53. For removing these workpieces, the spindle sleeve-side mandrel 42 is soldered by means of coating 35 to workpiece 31, said soldered connection being removed again after the table-side soldered connection.

FIG. 6 shows a cap-like workpiece 31, which is ferromagnetic and has a central bore. It only has to be provided on the table side with coating 35. On the spindle sleeve side, it is merely necessary to have a mandrel 42 with a centering means and one or more permanent magnets 34. The fixing process is the same as described relative to Fig. 2c. The table-side mandrel has a mushroom-shaped construction to adapt to the shape of the workpiece and, apart from heating winding 36, also contains a flushing bore, which is supplied by a flushing channel 44 in table 1.

Two different types of automatic erosion machines can be provided, a first universal type, with standardized crude electrodes 43, mandrels 42 and magazines 53 and the special production machine, which only produces one or a few workpiece types. In the second case, effort and expenditure is worthwhile for optimizing the components.

All the technical details given in the claims, description and drawings may be essential to the invention either singly or in random combination with one another.

While the fundamental novel features of the invention have been shown and described and pointed out, it will be understood that various substitutions and changes in the form of the details of the embodiments shown may be made by those skilled in the art without departing from the concepts of the invention as limited only by the scope of the claims which follow.

What is claimed is:

1. An electroerosion machine comprising:
   a supporting table disposed in an xy plane;
   first means to move the table in the x direction in said xy plane;
   second means to move the table in the y direction in said xy plane;
   a spindle sleeve disposed along a z axis at right angles to the xy plane and disposed above the xy plane, said sleeve having a device for detachably holding an electrode, the device including a removable mandrel having a free end with a permanent magnet secured thereto, and further includes heating means connected to the device for melting soft solder applied in the vicinity thereof;
   a container adapted to be filled with a dielectric fluid and secured to said table, said container having a partition dividing same into first and second working zones;
   wire cutting means having a cutting wire and disposed in the first zone, said cutting means being tiltable to tilt the wire with respect to the xy plane;
   at least one magazine which is secured to the container and is movable therewith; and
   at least one table-side mandrel supported by a tool table, the table-side mandrel and table being disposed in the second zone, each table-size mandrel carrying electrical heating means and having a free top end having a coating which can be soft soldered.

2. The machine of claim 1 wherein the cutting means is pivotable about an axis parallel to said xy plane.

3. The machine of claim 2 wherein the first zone has an exterior side wall and said cutting means is secured to said side wall.

4. The machine of claim 3 wherein the cutting means is provided with a u shaped clip having two parallel arms which are parallel to but offset from said axis, the cutting wire being secured to and extending between the free ends of said arms.

5. The machine of claim 4 further including a drilling electrode secured to said clip.

6. The machine of claim 4 further including at least one probe secured to said clip and extending at right angles to a plane defined by the arms of the clip.

7. The machine of claim 1 further including an electrode changer connected to a container and movable therewith.

8. The machine of claim 7 wherein the changer carries a workpiece pallet with a workpiece carrying mandrel.

9. The machine of claim 1 wherein the heating means utilizes electrical resistance heating.

10. The machine of claim 1 wherein the heating means utilizes induction heating.

11. The machine of claim 1 further including a crude electrode secured to said sleeve and having a flushing bore.

12. The machine of claim 1 further including means coupled to the sleeve to rotate the mandrel about its own axis.

13. In an electroerosion process, the steps of:
   (a) providing a magazine, the magazine containing a plurality of crude electrodes which are interconnected one to the other by a connecting web and are wound one next to the other while so interconnected onto a reel;
   (b) removing one stored crude electrode from the electrode by cutting the web to release the stored electrode;
   (c) soft soldering the removed electrode to a mandrel mounted on a spindle to secure the removed electrode to the mandrel;
   (d) subjecting the removed electrode while remaining secured to the mandrel to wire cutting erosion in a first working zone to shape the removed electrodes into finished form;
   (e) removing a workpiece from a pallet through use of magnetic forces;
   (f) soft soldering the removed workpiece, in a second working zone to a supporting surface in the second zone; and
   (g) subjecting the removed workpiece while remaining supported in the second zone to electroerosion using said shaped electrode.

* * * * *